(12) United States Patent
Chen et al.

(10) Patent No.: US 8,871,030 B2
(45) Date of Patent: Oct. 28, 2014

(54) CLEANING PATH GUIDANCE METHOD COMBINED WITH DIRT DETECTION MECHANISM

(75) Inventors: Shui-Shih Chen, New Taipei (TW); You-Wei Teng, New Taipei (TW)

(73) Assignee: MSI Computer(Shenzhen) Co., Ltd., Shenzhen (CN)

( * ) Notice: Subject to any disclaimer, the term of this patent is extended or adjusted under 35 U.S.C. 154(b) by 721 days.

(21) Appl. No.: 13/184,700

(22) Filed: Jul. 18, 2011

(65) Prior Publication Data
US 2012/0247510 A1    Oct. 4, 2012

(51) Int. Cl.
*B08B 5/04* (2006.01)
*B08B 7/04* (2006.01)
*G05D 1/02* (2006.01)

(52) U.S. Cl.
CPC ............ *G05D 1/0274* (2013.01); *G05D 1/0219* (2013.01); *A47L 2201/04* (2013.01); *A47L 2201/06* (2013.01); *G05D 2201/0203* (2013.01)
USPC ................... 134/18; 134/21; 134/42; 15/319; 15/340.1

(58) Field of Classification Search
USPC .................. 134/18, 21, 42; 15/319, 340.1
See application file for complete search history.

(56) References Cited

U.S. PATENT DOCUMENTS

| | | | |
|---|---|---|---|
| 2005/0150519 A1* | 7/2005 | Keppler et al. | 134/19 |
| 2009/0194137 A1* | 8/2009 | Friedman et al. | 134/18 |
| 2013/0118528 A1* | 5/2013 | Kim et al. | 134/18 |

* cited by examiner

*Primary Examiner* — Saeed T Chaudhry
(74) *Attorney, Agent, or Firm* — Rabin & Berdo, P.C.

(57) ABSTRACT

A cleaning path guidance method combined with a dirt detection mechanism is performed in an automatic cleaning device to generate a cleaning path, so as to guide the automatic cleaning device to clean an area to be cleaned, in which plural grids are defined in the area. The method includes: moving the automatic cleaning device in the area to clear dirt away, and continuously detecting a flow of the dirt cleared away to obtain a dirt level of a current gird; if the dirt level of the current gird exceeds a threshold, marking the grid as a dirty grid; performing an algorithm and finding a shortest path passing through all dirty grids as a cleaning path according to the marked dirty grids; and moving the automatic cleaning device to pass through each dirty grid according to the clean path, so as to clean each dirty gird sequentially.

15 Claims, 5 Drawing Sheets

CLEANING PATH GUIDANCE METHOD COMBINED WITH DIRT DETECTION MECHANISM

CROSS-REFERENCES TO RELATED APPLICATIONS

This non-provisional application claims priority under 35 U.S.C. §119(a) on Patent Application No. 100111123 filed in Taiwan, R.O.C. on Mar. 3, 2011, the entire contents of which are hereby incorporated by reference.

BACKGROUND

1. Technical Field

The present invention relates to cleaning path guidance of an automatic cleaning device, and more particularly to a cleaning path guidance method combined with a dirt detection mechanism.

2. Related Art

An automatic cleaning device is generally a dust suction device that has moving power and an obstacle detection function to move by itself in an area to be cleaned, so as to clean the area to be cleaned.

In order to clear thoroughly the area to be cleaned, the automatic cleaning device has one or multiple path guidance mechanisms for guiding the automatic cleaning device along a certain path to clean the area to be cleaned.

The simplest path guidance mechanism is a simple mode-switch guidance mechanism. In the simple mode-switch guidance mechanism, a plurality of cleaning path modes such as a bounce cleaning path mode, a wall follow cleaning path mode, and a Snake cleaning path mode is built in the automatic cleaning device. The automatic cleaning device generally takes a time schedule as a basis for switching. When a specified time point is reached, the automatic cleaning device is switched to a cleaning path mode corresponding to the time point. Through the simple mode-switch guidance mechanism, the automatic cleaning device performs different cleaning path modes and ensures a good cleaning effect for different dirt distribution and dirt levels. However, for a relatively complex indoor environment, for example, a room/house of a particular layout or a house with many obstacles, the simple mode-switch guidance mechanism cannot ensure that the automatic cleaning device can complete the cleaning thoroughly.

For the simple mode-switch guidance mechanism, an improved solution integrated with artificial intelligence (AI) is proposed. In a mode-switch guidance mechanism integrated with AI, the multiple cleaning path modes is still built in the automatic cleaning device, but a dirt detection mechanism is further set in the automatic cleaning device to detect the dirt distribution and the dirt level through various sensors. By analyzing the dirt distribution and the dirt level through AI, the automatic cleaning device can select a cleaning path mode in which the cleaning is most likely completed from multiple cleaning path modes and is switched to the selected cleaning path mode. After being integrated with AI, the cleaning path mode built in the automatic cleaning device is the same as the simple mode-switch guidance mechanism, but the automatic cleaning device can select an optimal cleaning path mode through AI, in order to complete the cleaning fully.

In the two guidance modes, the automatic cleaning device goes forward blindly and changes a travel direction when touching an obstacle or a preset border. In this case, the automatic cleaning device may rarely or even never pass through a specific local block, thus resulting in poor cleaning in the specific local block.

A systematic navigation guidance mechanism is further therefore proposed to integrate a simultaneous localization and mapping (SLAM) algorithm into the automatic cleaning device. The automatic cleaning device makes a map of the area to be cleaned in a cleaning process. The automatic cleaning device plans an optimal cleaning strategy in the area to be cleaned in combination with the dirt detection mechanism, so as to ensure that each corner in the area to be cleaned can really be cleaned.

In theory, the systematic navigation guidance mechanism is an optimal guidance mechanism and is capable of really completing the cleaning, but in practice, due to disadvantages of the detection mechanism and a poor design of a dust suction mechanism, the following problems occur: the specific local block is not really cleaned, the cleaning effect is influenced negatively due to misjudgment of the detection mechanism, and the cleaning time is too long. Planning an optimal cleaning strategy through a detection result of the dirt detection mechanism and a map of areas to be cleaned is therefore still a problem to be solved.

SUMMARY

In order to solve the following problems existing in the navigation mechanisms in the prior art that the specific local block is not really cleaned, the cleaning effect is influenced negatively due to misjudgment of a detection mechanism, and the cleaning time is too long, the present invention is directed to a cleaning path guidance method combined with a dirt detection mechanism for generating an optimal cleaning path to guide an automatic cleaning device to complete cleaning operations.

The present invention provides a cleaning path guidance method combined with a dirt detection mechanism, which is performed in an automatic cleaning device to generate a cleaning path, so that an automatic cleaning device cleans an area to be cleaned according to the clean path, in which a plurality of grids is defined in the area to be cleaned.

The method includes: moving the automatic cleaning device in the area to be cleaned, and clearing dirt away with the automatic cleaning device; in a process of moving the automatic cleaning device, continuously performing a simultaneous localization and mapping (SLAM) algorithm to determine a current position of the automatic cleaning device; in the process of moving the automatic cleaning device, detecting a flow of the dirt cleared away to obtain a dirt level of a current gird; when the dirt level of the current gird exceeds a threshold, marking the grid as a dirty grid; finding a shortest path passing through all dirty grids as a cleaning path according to the marked dirty grids; and moving the automatic cleaning device to pass through each dirty grid according to the clean path, so as to clean each dirty gird sequentially.

In the cleaning process, the dirt level is evaluated according to the flow of the dirt actually sucked and cleared away, so that the dirt level of each grid in the area to be cleaned can be correctly evaluated, so as to plan a new cleaning path. A grid required to be preferentially cleaned in the next cleaning operation can be set in this cleaning path according to the dirt level, thereby enhancing the cleaning effect. At the same time, a shortest path that the automatic cleaning device must travel through can be found according to the dirty grids, so that the time required for cleaning the area to be cleaned is shortened.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
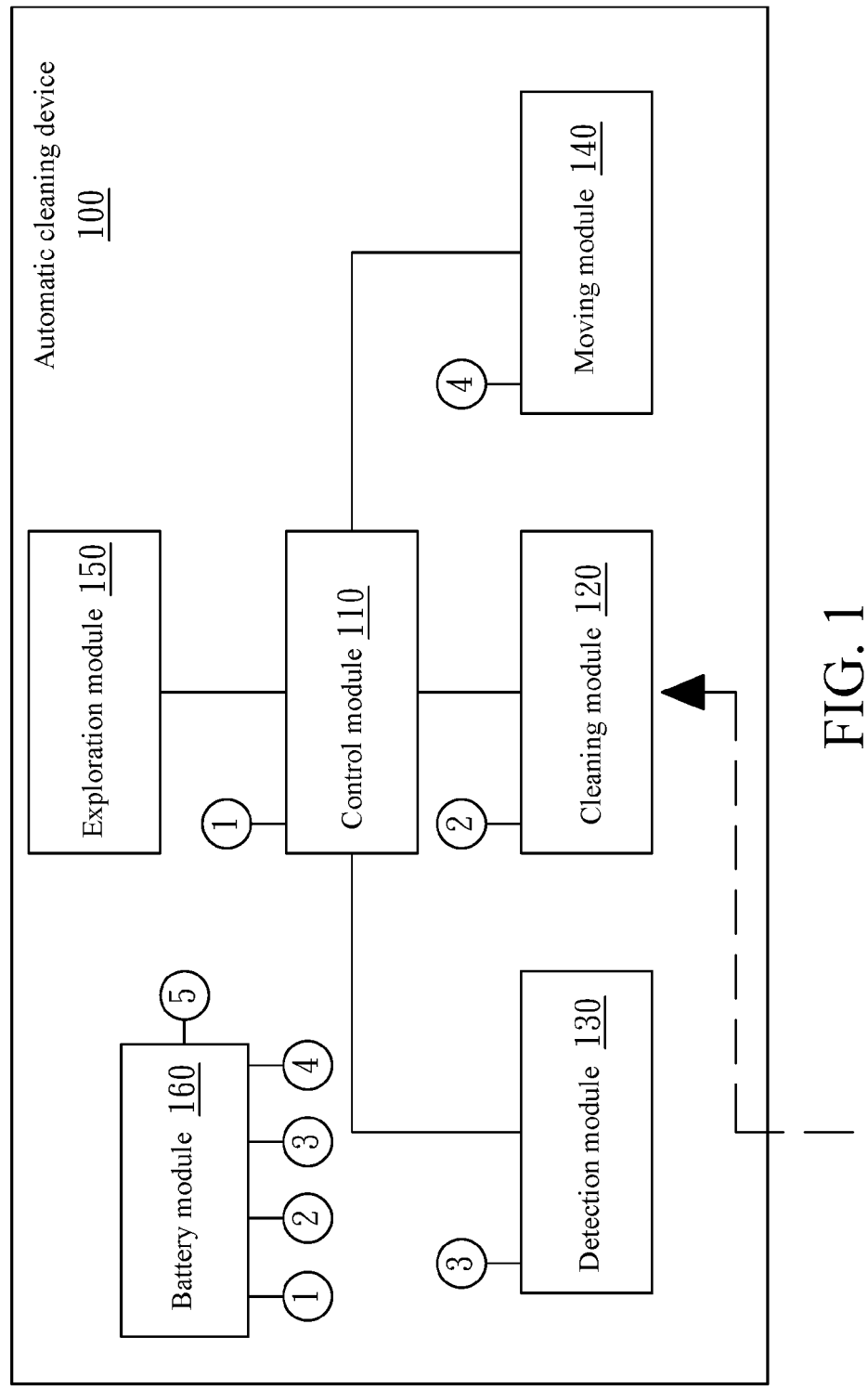
FIG. 1 is a circuit block diagram of an automatic cleaning device according to an embodiment of the present invention, which is used for performing a cleaning path guidance method combined with a dirt detection mechanism.

FIG. 1 is a circuit block diagram of an automatic cleaning device 100 according to an embodiment of the present invention. Referring to FIG. 1, the automatic cleaning device 100 is used for cleaning an area to be cleaned, in which a plurality of grids is defined in the area to be cleaned. The automatic cleaning device 100 includes a control module 110, a cleaning module 120, a detection module 130, a moving module 140, an exploration module 150, and a battery module 160, which are disposed in a machine body.

The battery module 160 is used for powering the control module 110, the cleaning module 120, the detection module 130, the moving module 140, and the exploration module 150. The detection module 130, the cleaning module 120, the moving module 140, and the exploration module 150 are electrically connected to the control module 110. The cleaning module 120 is used for generating a negative pressure for sucking dirt to clear away the dirt (such as dust or paper scraps), in the area to be cleaned, so as to clean the area to be cleaned. The detection module 130 is used for detecting a flow of the dirt cleared away by the cleaning module 120 to obtain a dirt level of each grid. The moving module 140 is used for moving the machine body. The control module 110 is used for controlling the moving module 140, so that the machine body is moved along a cleaning path to clean each grid of the area to be cleaned.

Figure 2:
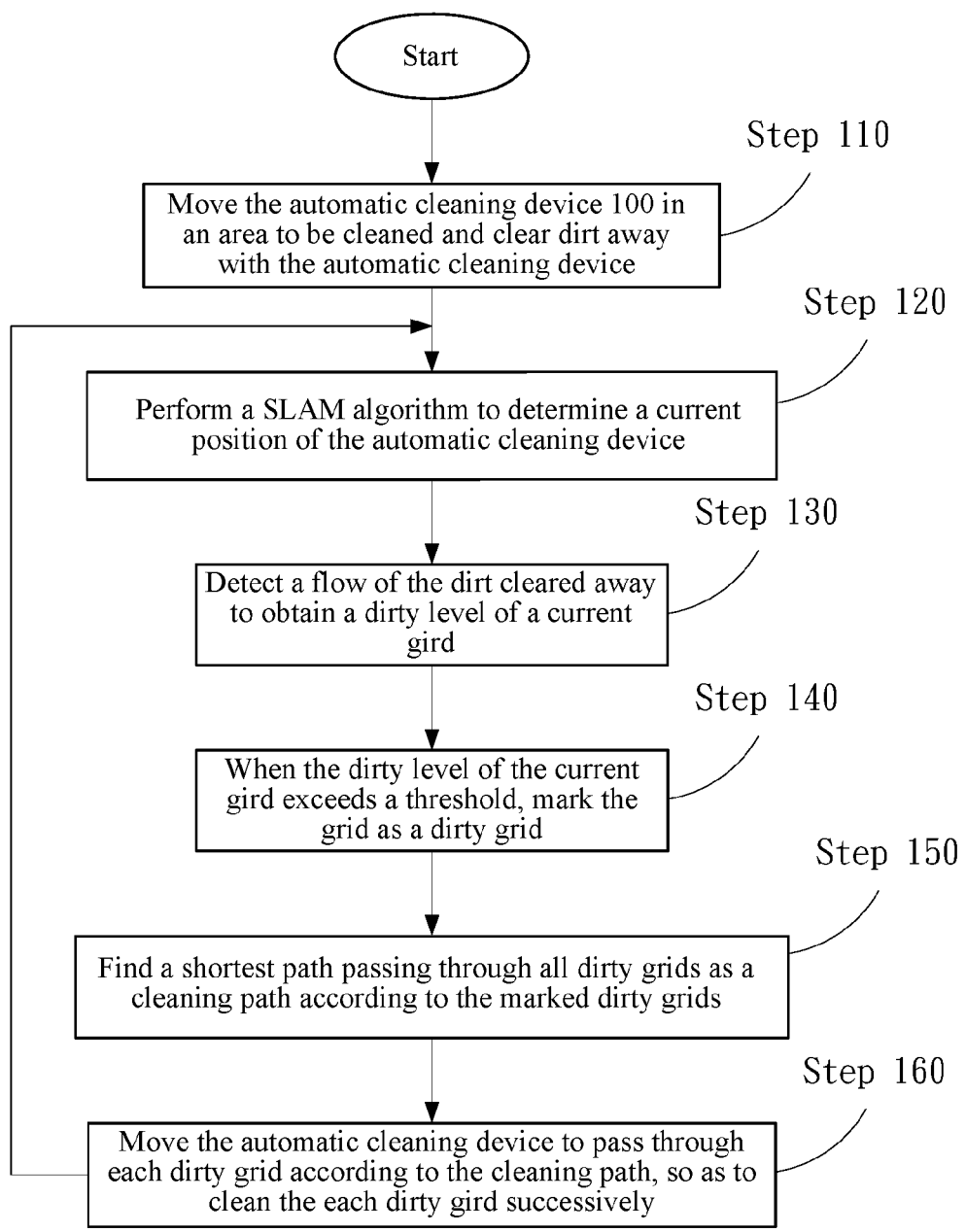
FIG. 2 shows a cleaning path guidance method combined with a dirt detection mechanism according to a first embodiment of the present invention.

FIG. 2 shows a cleaning path guidance method combined with a dirt detection mechanism according to a first embodiment of the present invention. The cleaning path guidance method is used for generating a cleaning path, so that the automatic cleaning device 100 cleans the area to be cleaned along the clean path. The control module 110 of the automatic cleaning device 100 executes a control code to perform the cleaning path guidance method combined with the dirt detection mechanism. During the process in which the automatic cleaning device 100 cleans the area to be cleaned, the control module 110 analyzes the dirt level of each grid to generate and store a cleaning path. In subsequent cleaning operations, the control module 110 of the automatic cleaning device 100 can load the cleaning path and move the automatic cleaning device 100 along the cleaning path to enhance the cleaning of the grids in the cleaning path.

After the automatic cleaning device 100 is started, the control module 110 begins to drive the moving module 140 according to the control code executed by the control module 110 to move the automatic cleaning device 100 in the area to be cleaned. Meanwhile, the control module 110 also starts the cleaning module 120, so that the cleaning module 120 begins to generate the negative pressure to begin to clear the dirt away, as shown in Step 110.

During the process in which the moving module 140 moves the automatic cleaning device 100, the control module 110 obtains a parameter of an surrounding environment through the exploration module 150 and continuously performs the SLAM algorithm, so as to map each grid of the area to be cleaned, generate a relative position relation of the grids, and determine a current position of the automatic cleaning device 100, as shown in Step 120.

Meanwhile, the detection module 130 continuously detects the flow of the dirt cleared away by the cleaning module 120 to obtain a dirt level of a current grid, so that the control module 110 analyzes the dirt level of the current grid, as shown in Step 130.

When the dirt level of the current grid exceeds a threshold, the control module 110 marks the grid as a dirty grid, as shown in Step 140.

After the cleaning operations are completed, the control module 110 finds a shortest path passing through all dirty grids according to the marked dirty grids to as a cleaning path, and the control module 110 prevents the cleaning path from passing through the same dirty grid repeatedly, as shown in Step 150.

Finally, the control module 110 controls the moving module 120 to move the automatic cleaning device 100 according to the clean path, so that the automatic cleaning device 100 passes through each dirty grid and clean each dirty grid sequentially, as shown in Step 160.

Generally speaking, dirty places in a home environment are usually concentrated in certain blocks, for example, the kitchen floor and blocks around a front door. In one or more embodiments of the present invention, each time the automatic cleaning device 100 cleans a grid, the detection module 130 continuously detects the dirt level of each grid to determine dirty grids, so as to enhance the cleaning of the dirty girds, thereby ensuring that the efficiency of cleaning the home environment is increased greatly.

In practice, the detection module 130 may be a microphone. The method for detecting the flow of the dirt cleared away by the cleaning module 120 includes: obtaining a noise value by the microphone when the cleaning module 120 operates to clear away the dirt, and determining the dirt level according to the noise value. Generally, when the dirt level of the gird is high, and the cleaning module 120 sucks the dirt with the negative pressure, a high dirt flow will cause a high noise. A value obtaining by subtracting original system noise from the noise value may therefore be taken as the dirt level of the gird.

Moreover, the detection module 130 may be an optical detection module 130, for detecting a light transmittance of an air flow generated when the cleaning module 120 clears the dirt away as the dirt level. A high light transmittance represents a small amount of dirt and a low dirt level, and a low light transmittance represents a large amount of dirt and a high dirt level.

Moreover, the dirty grids are not necessarily adjacent to one another, thereby forming a disordered distribution. At this time, at least one dirty block can be determined according to the dirty grids through correlation degree analysis, in which the dirty block includes a plurality of grids. A step of implementing a cleaning path mode for the dirty block is added in the cleaning path in the control module 110, so as to completely clean the grids belonging to the dirty block. The cleaning path mode may be a bounce cleaning path mode, a wall follow cleaning path mode, a snake cleaning path mode, or a combination thereof, so as to ensure that the cleaning of each grid of the dirty block is enhanced, and prevent a clean grid from being influenced by the adjacent dirty grids.

The method for determining the dirty block according to the dirty grids may be a clustering algorithm, for example, a fuzzy C-means algorithm. The calculation process is as follows.

Each dirty grid is denoted as x, and a degree of membership of the dirty grid x to a $k^{th}$ dirty block is $u_k(x)$. For each dirty grid x, the sum of the degree of membership is 1.

$$\forall \, x \left( \sum_{k=1}^{\text{total number of dirty blocks}} u_k(x) = 1 \right)$$

A center position of the $k^{th}$ dirty block is determined by:

$$\text{center}_k = \frac{\sum_x u_k(x)^m x}{\sum_x u_k(x)^m}$$

After the center position $\text{center}_k$ is determined, the degree of membership $u_k(x)$ of the dirty grid x to the $k^{th}$ dirty block is determined according to the following equation.

$$u_k(x) = \frac{1}{\sum_j \left( \frac{d(\text{center}_{k,x})}{d(\text{center}_{k,j})} \right)^{2/(m-1)}}$$

After dirty grids x belonging to the $k^{th}$ dirty block are arranged according to the degree of membership $u_k(x)$, a plurality of dirty blocks can be determined.

For example, a certain block in a kitchen or the whole kitchen is usually the dirtiest block in the area to be cleaned, but the control module 110 does not necessarily mark each grid in the kitchen as the dirty grid, thus preventing grids which are dirty but the dirt level of which is lower than the threshold, from being ignored. Through the clustering algorithm, the area to which the whole kitchen belongs can be defined as a dirty block. When the cleaning path is generated, a shortest path needs not to be planed in this dirty block, but the dirty block is regarded as a large range of dirt, and various cleaning path modes are directly implemented in the dirty block, so as to clean each grid completely.

The fuzzy C-means algorithm is only an example of the clustering algorithm, and the clustering algorithm adopted by the present invention is not limited thereto.

After the plurality of dirty blocks is defined, the planed cleaning path must pass through each dirty block, and then various cleaning path modes are performed in the dirty blocks sequentially. Before the cleaning path is generated, a weight value is first assigned to each dirty block according to a size and the dirt level, an order of the dirty blocks is determined according to the weight values, and the cleaning path is generated according to the order.

An example of the method for determining the weight value of each dirty block is as follows:

$$w_i = k_1 L_i k_2 A_i$$

where $w_i$ is a weight value of an $i^{th}$ dirty block, $L_i$ is a dirt level, and $A_i$ is an area of the $i^{th}$ dirty block; and $k_1$ and $k_2$ are constants.

Similarly, the weight value calculation formula is only an example, and the weight value calculation formula adopted by the present invention is not limited thereto.

Figure 3A:
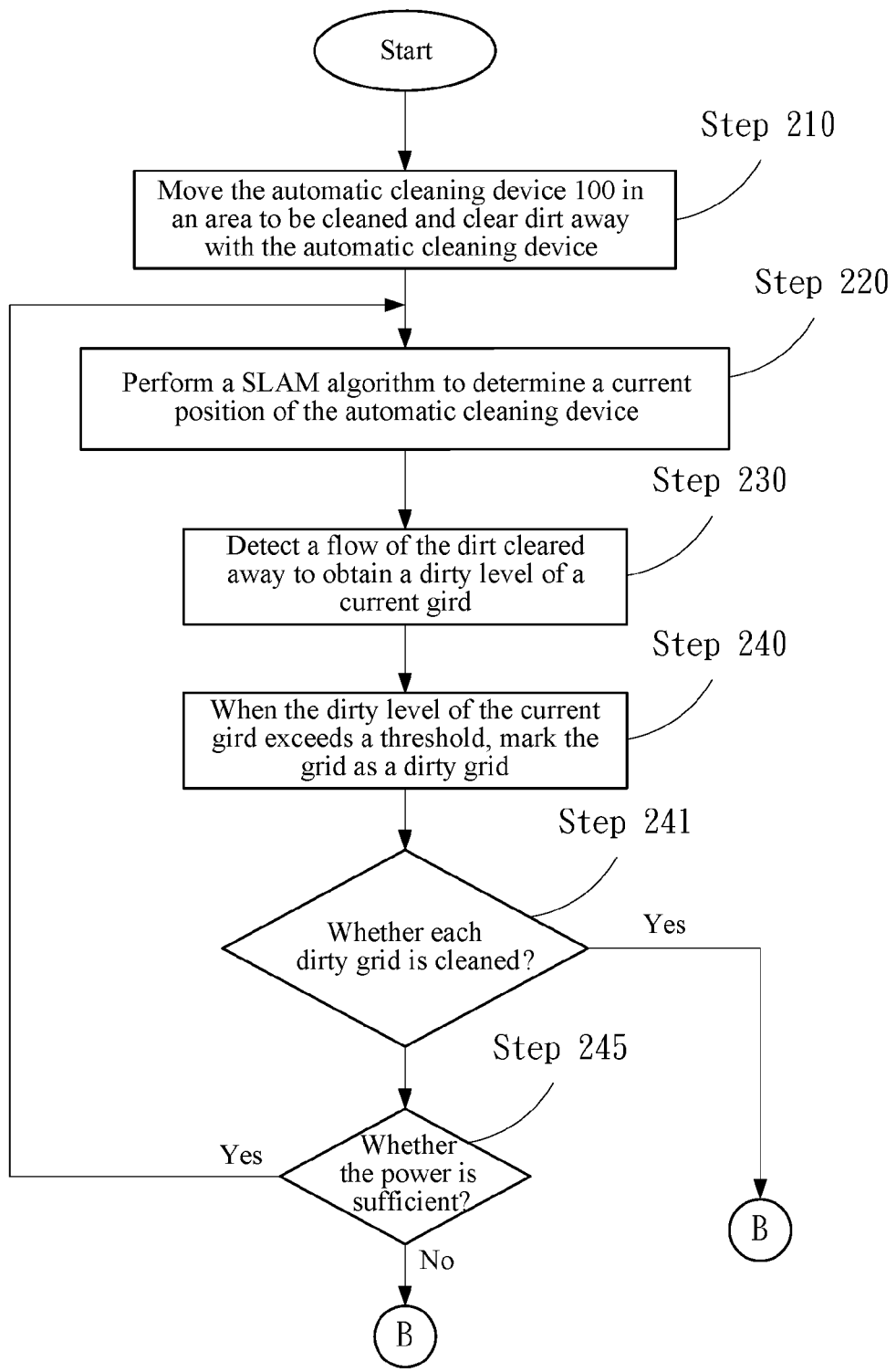
FIGS. 3A, 3B, and 3C show a cleaning path guidance method combined with a dirt detection mechanism according to a second embodiment of the present invention.
Figure 3B:
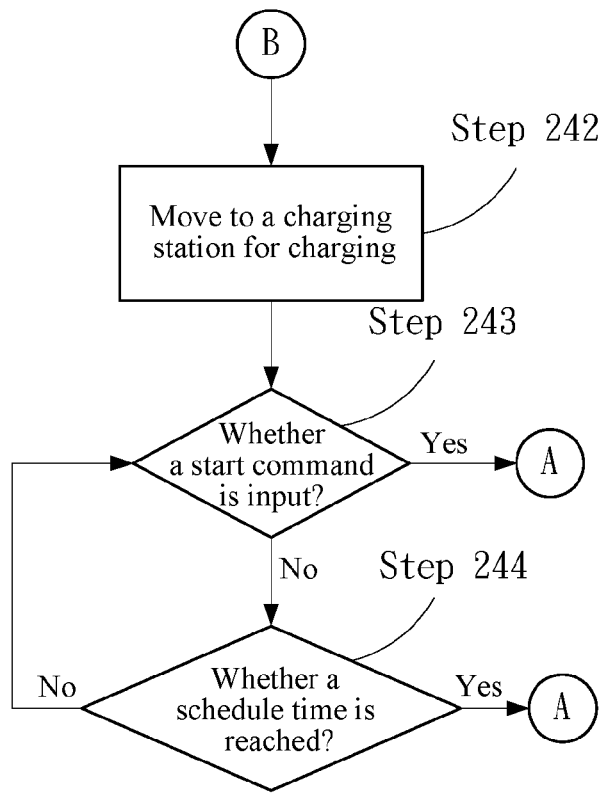
Figure 3C:
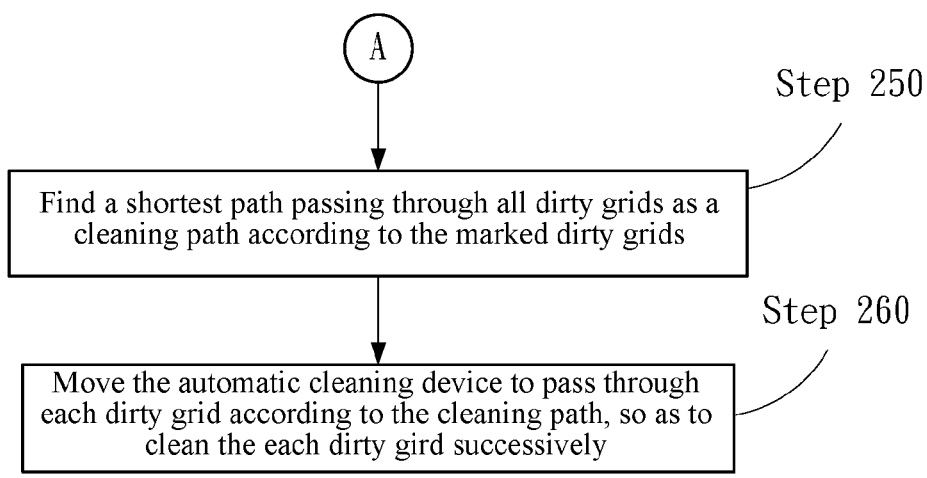

FIGS. 3A, 3B and 3C show a cleaning path guidance method combined with a dirt detection mechanism according to a second embodiment of the present invention. As shown in FIG. 1, the automatic cleaning device 100 is powered by the built-in battery module 160, but the battery module 160 has a limited electric capacity. The automatic cleaning device 100 must charge the battery module 160 to maintain the operation after the power of the battery module 160 is consumed. The automatic cleaning device 100 must therefore automatically return to a charging station for charging when the quantity of electricity of the battery module 160 is excessively low. Meanwhile, the automatic cleaning device 100 does not continuously perform the cleaning operations, but is automatically started for performing the cleaning operations when it is started or a schedule time is reached. The process of the first embodiment can therefore be expanded as follows.

As shown in FIGS. 3A, 3B and 3C, after the automatic cleaning device 100 is started, the control module 110 also executes a cleaning program according to the control code executed thereby, cleans the grids one by one according to a cleaning path, and continuously marks dirty grids, as shown in Steps 210 to 240.

Every time after a dirty grid is cleaned, the control module 110 first determines whether each dirty grid is cleaned, as shown in Step 241.

If the control module 110 determines that each dirty grid in the cleaning path is cleaned in Step 241, the control module 110 controls the moving module 140 to move the automatic cleaning device 100 to a charging station, so as to charge the battery module 160, as shown in Step 242. Meanwhile, the control module 110 is switched to a standby state to wait for an input start command.

Every time after a predetermined waiting time, the control module 110 determines whether a start command is input, as shown in Step 243.

If a start command is input, the control module 110 starts the automatic cleaning device 100 again to load a re-planned cleaning path and performs the cleaning operations according to the clean path again, as shown in Steps 250 and 260.

The start command may be sent by an operation panel disposed on the machine body or sent by a remote end to remotely control the control module 110 to be started.

If no start command is input, the control module 110 further checks a schedule to determine whether a current time reaches the schedule time, as shown in Step 224.

If the schedule time is reached, the control module 110 starts the automatic cleaning device 100 again to load a re-planned cleaning path and performs the cleaning operations according to the clean path again. If the schedule time is not reached, the control module 110 waits for an input start command again, as shown in Steps 250 and 260.

Similarly, if the cleaning operations of all dirty girds in the cleaning path are not yet completed, the control module 110 first determines whether the battery module 160 has sufficient power for returning to the charging station after a next grid is cleaned, as shown in Step 245, and if yes, the control module 110 continuously cleans the next dirty grid according to the current cleaning path.

In the cleaning process, the control module 110 continuously obtains an environment parameter through the exploration module 150 and performs the SLAM algorithm, so as to update the map and determine the current position of the automatic cleaning device 100; meanwhile, the control module 110 continuously determines the dirt level of grids in cleaning through the control module 110, so as to update a date record of dirty grids.

If the power of the battery module 160 is not sufficient for the automatic cleaning device 100 to return to the charging station after the next grid is cleaned, that is, the power of the battery module 160 is only sufficient for the automatic cleaning device 100 to directly return to the charging station, the automatic cleaning device 100 is moved to the charging station to charge the battery module 160, as shown in Step 242.

After being schedule-started or being started after receiving the start command, the control module 110 loads the cleaning path not yet completed to continuously complete the cleaning.

In an embodiment that the dirty blocks are marked, a specific schedule time point may be specified in a schedule to drive the automatic cleaning device 100 to perform the cleaning for at least one corresponding dirty block. For example, a kitchen area is cleaned after dinner, or a living room or sitting room area is cleaned during working hours in the daytime.

The control module 110 may re-plan a cleaning path every time after being started (schedule-started or manually started), in which the cleaning path may include grids needing to be preferentially cleaned and a path for returning to the charging station. The automatic cleaning device 100 can therefore use fully the power stored by the battery module 160 to continuously perform the cleaning operations, and the automatic cleaning device 100 can return to the charging station.

In this embodiment, the control module 110 needs to determine the quantity of electricity of the battery module 160 first, so as to determine a sustainable operation time of the automatic cleaning device 100. For example, if the control module 110 determines that the quantity of electricity of the battery module 160 is 30% of a saturated quantity of electricity, which can support the automatic cleaning device 100 to continuously operate for 27 minutes, the control module 110 plans a cleaning path along which the automatic cleaning device 100 continuously operates for 27 minutes.

The control module 110 divides the sustainable operation time into a cleaning stage for performing the cleaning operations and a returning stage for not performing the cleaning but returning to the charging station. A fixed ratio may be set for the cleaning stage, for example, the cleaning stage may be set to account for two thirds of the sustainable 27-minute operation time, that is, 18 minutes. The control module 110 calculates the number of grids that the automatic cleaning device 100 can pass through during the cleaning stage according to the size of the grids and a moving speed of the automatic cleaning device 100. For example, if the size of each grid is 60 cm×60 cm and the moving speed of the automatic cleaning device 100 is one grid per six seconds, the automatic cleaning device 100 can pass through 180 grids within 18 minutes.

The control module 110 can generate a plurality of cleaning paths during the cleaning stage according to the 180 grids and the current position of the automatic cleaning device 100 (for example, a position of the charging station).

In the plurality of cleaning paths during the cleaning stage, a cleaning path with an optimal cleaning effect can be found for the control module 110 to control the moving module 140 to move the automatic cleaning device 100.

When finding the cleaning path with the optimal cleaning effect, a weight value of each dirty grid and a umber of times that the automatic cleaning device 100 passes through a single grid repeatedly are considered to generate a score.

For example, every time the cleaning path passes through a dirty grid, a plus score positively correlated with the dirt level is added. When the automatic cleaning device 100 repeatedly passes through the single grid once, a minus score is subtracted. Finally, after the scores of the cleaning paths are found, the cleaning path having the highest score is determine as the cleaning path with the optimal cleaning effect.

Figures 4A, 4B:
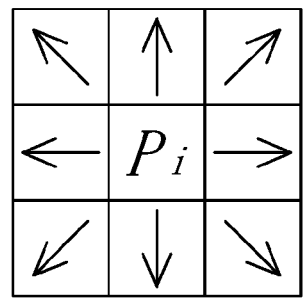
FIGS. 4A and 4B are schematic views of generation of a plurality of cleaning paths according to a Pi grid in a genetic algorithm.

An example of a method for finding the cleaning path with the optimal cleaning effect is a real genetic algorithm. A chromosome is designed as follows:

$$G=\{g1g2,\ldots g180\}$$

where, $gi=\{1, 2, \ldots, 8\}$ represents a grid with eight directions, as shown in FIG. 4A. For example, an original position of the automatic cleaning device 100 is P0, and a next position P1 may fall in one of $g1=1, 2, 3, \ldots, 8$, that is, the automatic cleaning device 100 reaches a position that is one of 1-8 in FIG. 4B.

An optimal function is defined as follows:

$$Z = \sum_{i=1}^{180(\textit{number of grids during the cleaning stage})} w_{pi} - k_{rep} \times n_{rep}$$

where $W_{Pi}$ is a weight value of a $Pi^{th}$ grid ($\forall W_j \geq 1$; if the gird does not belong to a dirty block, $\forall W_j = 1$); and $n_{rep}$ is the number of times that a path repeatedly passes through a grid, and $k_{rep}$ is a fixed value, representing a minus score value of a path repeatedly passing through the grids.

After the control module 110 performs a preset iteration operation according to the genetic algorithm, a maximum value of Z and a corresponding chromosome can be found, in which the chromosome is the cleaning path with the optimal cleaning effect.

The genetic algorithm described above is only an example, and the method for finding the clean path with the optimal clean effect according to the present invention is not limited thereto.

The returning stage is relatively simple. In the returning stage, the dirt level needs not to be considered, only a shortest path between P180 and P0, that is, a shortest path between a last position in the cleaning stage and the charging station, needs to be found.

Through the cleaning path guidance method combined with the dirt detection mechanism according to the embodiments of the present invention, the dirt level of each grid in the area to be cleaned can be correctly evaluated for planning a new cleaning path. In such a cleaning path, not only a grid to be preferentially cleaned can be set according to the dirt level, but also a shortest path that the automatic cleaning device must travel through can be found as far as possible, thereby the time for cleaning the area to be cleaned is shortened.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A cleaning path guidance method combined with a dirt detection mechanism, performed in an automatic cleaning device to generate a cleaning path for the automatic cleaning device to clean an area to be cleaned according to the clean path, wherein a plurality of grids is defined in the area to be cleaned, and the method comprises:
   moving the automatic cleaning device in the area to be cleaned, so as to clear dirt away with the automatic cleaning device;
   continuously performing a simultaneous localization and mapping (SLAM) algorithm to determine a current position of the automatic cleaning device, during said moving;
   detecting a flow of the dirt cleared away to obtain a dirt level of a current grid, during said moving;
   marking the grid as a dirty grid, when the dirt level of the current grid exceeds a threshold;
   finding a shortest path passing through all marked dirty grids as a cleaning path according to the marked dirty grids; and
   said moving including moving the automatic cleaning device to pass through each marked dirty grid according to the clean path, so as to clean each marked dirty grid sequentially.

2. The cleaning path guidance method combined with a dirt detection mechanism according to claim 1, wherein the detecting the flow of the dirt cleared away comprises:
   obtaining a noise value when clearing the dirt with a microphone as the dirt level of the grid.

3. The cleaning path guidance method combined with a dirt detection mechanism according to claim 1, wherein the detecting the flow of the dirt cleared away comprises detecting a light transmittance of an air flow generated when clearing the dirt as the dirt level.

4. The cleaning path guidance method combined with a dirt detection mechanism according to claim 1, further comprising determining at least one dirty block through the dirty grids, wherein the dirty block comprises a plurality of grids; adding a step of implementing a cleaning path mode for the dirty block in the cleaning path, so as to completely clean the grids belonging to the dirty block.

5. The cleaning path guidance method combined with a dirt detection mechanism according to claim 4, wherein the cleaning path is selected from a bounce cleaning path mode, a wall follow cleaning path mode, a Snake cleaning path mode, and a combination thereof.

6. The cleaning path guidance method combined with a dirt detection mechanism according to claim 4, wherein a method for generating a dirty block is a clustering algorithm.

7. The cleaning path guidance method combined with a dirt detection mechanism according to claim 4, wherein a plurality of dirty blocks is determined according to the dirty grids, a weight value is assigned to each dirty block according to a size thereof and the dirt level, an order of the dirty blocks is determined according to the weight values, and the cleaning path is generated according to the order of the dirty blocks.

8. The cleaning path guidance method combined with a dirt detection mechanism according to claim 4, further comprising driving the automatic cleaning device at a specific time point to perform cleaning for at least one corresponding dirty block.

9. The cleaning path guidance method combined with a dirt detection mechanism according to claim 1, further comprising moving the automatic cleaning device to a charging station for charging after each dirty grid in the cleaning path is cleaned.

10. The cleaning path guidance method combined with a dirt detection mechanism according to claim 9, wherein when the automatic cleaning device is charged, the method further comprises:
    waiting for an input start command, and after the start command is input, moving the automatic cleaning device to pass through each dirty grid according to the clean path to clean each dirty grid sequentially.

11. The cleaning path guidance method combined with a dirt detection mechanism according to claim 9, wherein when the automatic cleaning device is charged, the method further comprises:
    checking a schedule to determine whether a current time reaches a schedule time; and
    if the current time reaches the schedule time, moving the automatic cleaning device to pass through each dirty grid according to the clean path, so as to clean each dirty grid sequentially.

12. The cleaning path guidance method combined with a dirt detection mechanism according to claim 9, wherein every time after one of the grids is cleaned, the method further comprises:
    determining whether the automatic cleaning device has sufficient power for returning to the charging station after a next grid is cleaned; and
    if it does, the automatic cleaning device continuously cleaning the next dirty grid according to a current cleaning path; and if not, moving the automatic cleaning device to the charging station for charging.

13. The cleaning path guidance method combined with a dirt detection mechanism according to claim 1, wherein before the cleaning path is generated, the method further comprises:
    determining a sustainable operation time of the automatic cleaning device, and dividing the sustainable operation time into a cleaning stage and a returning stage;
    determining a number of grids that the automatic cleaning device passes through during the cleaning stage;
    generating a plurality of cleaning paths during the cleaning stage according to the current position of the automatic cleaning device and the number of grids; and
    finding a cleaning path with an optimal cleaning effect to move the automatic cleaning device to perform cleaning.

14. The cleaning path guidance method combined with a dirt detection mechanism according to claim 13, wherein the finding the cleaning path with the optimal cleaning effect comprises:
    every time the cleaning path passes through a dirty grid, adding a plus score positively correlated with the dirt level; and every time the cleaning path repeatedly passes through a grid, subtracting a minus score; and
    adding the plus scores and the minus scores to find a score of each cleaning path, so as to find a cleaning path having a highest score, that is, the cleaning path with the optimal cleaning effect.

15. The cleaning path guidance method combined with a dirt detection mechanism according to claim 13, wherein the finding a path during the returning stage comprises:
    finding a shortest path between an end point and a starting point of the cleaning path with the optimal cleaning effect as the path during the returning stage.

* * * * *